United States Patent
Garcia-Luna-Aceves

(10) Patent No.: US 10,454,820 B2
(45) Date of Patent: Oct. 22, 2019

(54) SYSTEM AND METHOD FOR STATELESS INFORMATION-CENTRIC NETWORKING

(71) Applicant: CISCO TECHNOLOGY, INC., San Jose, CA (US)

(72) Inventor: Jose J. Garcia-Luna-Aceves, San Mateo, CA (US)

(73) Assignee: Cisco Technology, Inc., San Jose, CA (US)

(*) Notice: Subject to any disclaimer, the term of this patent is extended or adjusted under 35 U.S.C. 154(b) by 233 days.

(21) Appl. No.: 14/869,740

(22) Filed: Sep. 29, 2015

(65) Prior Publication Data

US 2017/0093710 A1  Mar. 30, 2017

(51) Int. Cl.
| | | |
|---|---|---|
| *H04L 12/741* | (2013.01) | |
| *H04L 29/08* | (2006.01) | |
| *H04L 12/705* | (2013.01) | |

(52) U.S. Cl.
CPC ............ *H04L 45/74* (2013.01); *H04L 67/327* (2013.01); *H04L 45/18* (2013.01)

(58) Field of Classification Search
CPC .............................. H04L 45/74; H04L 67/327
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

(Continued)

*Primary Examiner* — Derrick W Ferris
*Assistant Examiner* — Farhad Ali

(57) ABSTRACT

One embodiment of the present invention provides a router in an information-centric network (ICN). The router includes a receiving module configured to receive an interest for a piece of content. The interest indicates a name associated with the piece of content. The router also includes an interest-processing module configured to: determine whether the interest can be forwarded; in response to determining that the interest can be forwarded to a second router, select an identifier from a set of identifiers assigned to the router by the second router; and process the interest by inserting the identifier into the interest. The router further includes a forwarding module configured to forward the processed interest to the second router.

21 Claims, 13 Drawing Sheets

(56) References Cited

U.S. PATENT DOCUMENTS

| | | |
|---|---|---|
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 * | 2/2016 | Oran ............... H04L 67/327 |
| 9,280,610 B2 | 3/2016 | Gruber |

(56) References Cited

U.S. PATENT DOCUMENTS

| | | |
|---|---|---|
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |

(56) References Cited

U.S. PATENT DOCUMENTS

| | | |
|---|---|---|
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1* | 12/2012 | Ravindran ......... H04L 12/6418 709/238 |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1* | 3/2013 | Wang .................. H04L 67/327 709/238 |
| 2013/0061084 A1 | 3/2013 | Barton |

(56) References Cited

U.S. PATENT DOCUMENTS

| | | |
|---|---|---|
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2017/0085441 A1* | 3/2017 | Azgin ............... H04L 43/028 |
| 2017/0142226 A1* | 5/2017 | De Foy ............. H04L 67/327 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |

(56) References Cited

FOREIGN PATENT DOCUMENTS

| | | |
|---|---|---|
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf.
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016].
Marc Mosko et al "All-in-One Streams for Content Centric Networks", May 24, 2015, retrieved from the Internet: http://www.ccnx.org/pubs/AllinOne.pdf [downloaded Jun. 9, 2016].
Cesar Ghali et al. "Elements of Trust in Named-Data Networking", Feb. 13, 2014 Retrieved from the internet Jun. 17, 2016 http://arxiv.org/pdf/1402.3332v5.pdf.
Priya Mahadevan et al. "CCN-KRS", Proceedings of the 1st International Conference on Information-Centric Networking, Inc. '14, Sep. 24, 2014.
Flavio Roberto Santos et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506.
Sun et al.: "Content-Based Route Lookup Using CAMs", Global Communications Conference, IEEE, Dec. 3, 2012.
Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography—About," http://crypto.stanford.edu/pbc. downloaded Apr. 27, 2015.
C. Gentry and A. Silverberg. Hierarchical ID-Based Cryptography. Advances in Cryptology—Asiacrypt 2002. Springer Berlin Heidelberg (2002).
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—Crypto 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer Science vol. 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In Infocom12 Mini-conference (2012).
Vijay Kumar Adhikari, Yang Guo, Fang Hao, Matteo Varvello, Volker Hilt, Moritz Steiner, and Zhi-Li Zhang. Unreeling Netflix:

(56) References Cited

OTHER PUBLICATIONS

Understanding and Improving Multi-CDN Movie Delivery. In the Proceedings of IEEE Infocom 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (Pursuit)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "Conet: A content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al.,'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (Infocom Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' Infocom 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the

(56) References Cited

OTHER PUBLICATIONS

Internet: URL:http://www.cs.uni-paderborn.de/fileadmin/informationik/ag-karl/publications/miscellaneous/optimizing.pdf (retrieved on Mar. 9, 2012) . . . .
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks,' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM. 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE Infocom 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.

(56) References Cited

OTHER PUBLICATIONS

T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56 . . . .
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.

\* cited by examiner

FORWARDING INFORMATION BASE 200

| NAME PREFIX | NEXT HOP | DISTANCE |
|---|---|---|
| $n(1)^*$ | $S_{n(1)^*}^i$ | $D(i, n(1)^*, q)$, $q$ belongs to $S_{n(1)^*}^i$ |
| ... | ... | ... |
| $n(j)^*$ | $S_{n(j)^*}^i$ | $D(i, n(j)^*, q)$, $q$ belongs to $S_{n(j)^*}^i$ |
| ... | ... | 202 |

FIG. 2

LOCAL INTERESTS GATHERED TABLE 300

| NAME OF CO | POINTER | LOCAL CONSUMER |
|---|---|---|
| $n(1)$ | $p[n(1)]$ | $lc[n(1)]$ |
| ... | ... | ... |
| $n(j)$ | $p[n(j)]$ | $lc[n(j)]$ |
| ... | ... 302 | ... |

FIG. 3

ANONYMOUS ROUTING TABLE 400

| LOCAL ID | PREVIOUS HOP | NAME PREFIX |
|---|---|---|
| $a_1$ | router $i$ | $n(j)^*$ |
| ... | ... | ... 402 |
| $a_k$ | $p^i(a_k)$ | nil |
| ... | ... | ... 404 |

FIG. 4

LOCAL INTERVAL SET TABLE 500

| FACE | LOCAL INTERVAL ASSIGNED BY FACE | LOCAL INTERVAL ASSIGNED TO FACE |
|---|---|---|
| $p$ | $LI^i(p, i)$ | $LI^i(i, p)$ |
| ... | ... | ... |
| $k$ | $LI^i(k, i)$ | $LI^i(i, k)$ |
| ... | ... 502 | ... |

FIG. 5

Algorithm for Processing Interest from Local Consumer
at Router $i$

1: function Interest_Source
2: INPUT: $LIGHT^i$, $LIST^i$, $FIB^i$, $ART^i$, $I[n(j),c]$;
3: if $n(j) \in LIGHT^i$ then
4:     if $p[n(j)] \neq nil$ then
5:         retrieve CO $n(j)$; send $DP[n(j), sp(j), c]$ to $c$
6:     else
7:         $lc[n(j)] = lc[n(j)] \cup c$; $p[n(j)] = nil$   (% Interest is aggregated)
8:     end if
9: else
10:     if $n(j)^* \in LIGHT^i$ then
11:         send $NA[n(j), \text{no content}, c]$; (% $n(j)$ does not exist)
12:     else
13:         if $n(j)^* \notin FIB^i$ then
14:             send $NA[n(j), \text{no route}, c]$ to $c$   (% No route to $n(j)^*$ exists)
15:         else
16:             create entry for $n(j)$ in $LIGHT^i$: (% Interest from $c$ is recorded)
                $lc[n(j)] = lc[n(j)] \cup c$; $p[n(j)] = nil$;
17:             for each $v \in N^i$ by rank in $FIB^i$ do
18:                 if $\exists ART^i(a,p,n) \; (a \in LI^i(v,i) \wedge p = i \wedge n = n(j)^*)$ then
                    $AID^I(i) = a$; send $I[n(j), AID^I(i)]$ to $v$; return
19:                 else
20:                     select $AID \mid AID \in LI^i(v,i) \wedge AID \neq a \; \forall \; ART^i(a,i,n)$;
                    create new entry $ART^i(AID, i, n(j)^*)$;
                    $AID^I(i) = AID$; send $I[n(j), AID^I(i)]$ to $v$; return
21:                 end if
22:             end for
23:         end if
24:     end if
25: end if
25: end function

FIG. 11

Algorithm for Processing Interest from Router $k$ at Router $i$

```
1: function Forwarding
2: INPUT: LIGHT^i, LIST^i, FIB^i, ART^i, I[n(j), AID^I(k)];
3: if n(j) ∈ LIGHT^i then
4:     if p[n(j)] ≠ nil then
5:         retrieve CO n(j);
6:         AID^R(i) = AID^I(k); send DP[n(j), sp(j), AID^R(i)] to k
7:     end if
8: else
9:     if n(j)* ∈ LIGHT^i then
10:        AID^R(i) = AID^I(k);
           send NA[n(j), no content, AID^R(i)] to k; (% n(j) does not exist)
11:    else
12:        if n(j)* ∉ FIB^i then
13:            AID^R(i) = AID^I(k)
               send NA[n(j), no route, AID^R(i)] to k  (% No route to n(j)* exists)
14:        else
15:            for each v ∈ N^i by rank in FIB^i do
16:                if D(i, n(j)*, k) > D(i, n(j)*, v); (% LFR is satisfied) then
17:                    AID = f_i(k, v)[AID^I(k)];
18:                    if ∃ART^i(a, p, n) (a = AID ∧ p = k) then
19:                        AID^I(i) = AID; send I[n(j), AID^I(i)] to v
20:                    else
21:                        create new entry ART^i(AID, k, nil)
22:                    end if
23:                    return
24:                end if
25:            end for (% LFR is not satisfied; Interest may be traversing a loop)
26:            AID^R(i) = AID^I(k);
               send NA[n(j), loop, AID^R(i)] to k
27:        end if
28:    end if
39: end if
30: end function
```

FIG. 12

Data Packet-Processing Algorithm at Router $i$

1: function Data Packet
2: INPUT: $LIGHT^i$, $LIST^i$, $ART^i$, $DP[n(j), sp(j), AID^R(q)]$;
3: [o] verify $sp(j)$;
4: [o] if verification fails then discard $DP[n(j), sp(j), AID^R(q)]$
5: if $\exists ART^i(a, p, n)$ $(p = i)$
    (% router $i$ was the origin of the Interest) then
6:    for each $c \in lc[n(j)]$ do
7:        send $DP[n(j), sp(j), c]$ to $c$; $lc[n(j)] = lc[n(j)] - \{c\}$
8:    end for
9: end if
10: if $\exists ART^i(a, k, n)(k \in N^i)$ then
11:    $AID^R(i) = f_i^{-1}(k, q)[AID^R(q)]$;
       send $DP[n(j), sp(j), AID^R(i)]$ to $k$
12: end if
13: [o] if no entry for $n(j)$ exists in $LIGHT^i$ then
14:    create $LIGHT^i$ entry for $n(j)$: $lc[n(j)] = \varnothing$
15:    end if
16: [o] store CO in local storage; $p[n(j)] =$ address of CO in local storage
17: end function

FIG. 13

NACK Processing Algorithm at Router $i$

1: function NACK
2: INPUT: $LIGHT^i$, $LIST^i$, $ART^i$, $NA[n(j), CODE, AID^R(q)]$;
3: if $\exists ART^i(a, p, n)$ $(p = i)$
   (% router $i$ was the origin of the Interest) then
4:     for each $c \in lc[n(j)]$ do
5:         send $NA[n(j), CODE, AID^R(q)]$ to $c$; $lc[n(j)] = lc[n(j)] - \{c\}$;
           delete entry for $n(j)$ in $LIGHT^i$
6:     end for
7: end if
8: if $\exists ART^i(a, k, n)(k \in N^i)$ then
9:     $AID^R(i) = f_i^{-1}(k, q)[AID^R(q)]$;
       send $NA[n(j), CODE, AID^R(q)]$ to $k$
10: end if
11: end function

FIG. 14

SYSTEM AND METHOD FOR STATELESS INFORMATION-CENTRIC NETWORKING

BACKGROUND

Field

The present disclosure relates generally to information-centric networks (ICNs). More specifically, the present disclosure relates to an ICN architecture that does not maintain per-Interest forwarding states.

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric Networking (CCN), an exemplary ICN architecture, brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In existing interest-based ICN approaches, such as CCN or Named Data Networking (NDN), routers (or nodes in the network) need to maintain a Pending Interest Table (PIT) in order to store the Interest state, including the interfaces from which Interests for specific named data objects (NDOs) are received and the interfaces over which such Interests are forwarded. The PIT allows NDOs that satisfy Interests to follow the reverse path back to the original requester while hiding the identity of the original requester. However, as the number of Interests handled by a router grows, so does the size of the PIT, which can be many orders of magnitude larger than the size of traditional routing tables because routers handle far more Interests than the number of routers in a network.

Definitions

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also, the HSVLI may not be human-readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICHALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and, optionally, other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. In this disclosure, the term "Content Object (CO)" and the term "Named Data Object (NDO)" are exchangeable.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the term "face," referring to an incoming or outgoing interface of an Interest.

"Prefix:" In this disclosure, the term "prefix" can be used to refer to either a name of a specific content object or a name prefix for the content object.

SUMMARY

One embodiment of the present invention provides a router in an information-centric network (ICN). The router includes a receiving module configured to receive an interest for a piece of content. The interest indicates a name associated with the piece of content. The router also includes an interest-processing module configured to: determine whether the interest can be forwarded; in response to determining that the interest can be forwarded to a second router, select an identifier from a set of identifiers assigned to the router by the second router; and process the interest by inserting the identifier into the interest. The router further includes a forwarding module configured to forward the processed interest to the second router.

In a variation on this embodiment, the forwarding module is further configured to send a response to the interest in response to the interest-processing module determining that the interest cannot be forwarded.

In a further variation, the interest-processing module is configured to determine that the interest cannot be forwarded based on one of: the piece of content cannot be found, no route can be found to a destination router advertising the piece of content, and the interest is traversing a loop. The response sent by the forwarding module includes a negative acknowledgment.

In a variation on this embodiment, the interest-processing module is configured to: in response to determining that the interest is received from a local user of the router, determine, based on a local interest table, whether a previous interest for the same piece of content exists. If so, the interest-processing module aggregates the received interest by adding the local user to the local interest table. If not, the interest-processing module creates a new entry in the local interest table for the piece of content.

In a variation on this embodiment, the received interest carries a previous identifier. While selecting the identifier, the interest-process module is configured to: perform a lookup in a local routing table based on the previous identifier; use the matching entry as the selected identifier in response to a matching entry being found; and in response to no matching entry being found, apply a bijection function to the previous identifier to obtain the selected identifier and generate an entry in the local routing table. The generated entry specifies the selected identifier and a third router from which the router receives the interest. The interest-processing module further generates the processed interest by replacing the previous identifier carried in the received interest with the selected identifier.

In a variation on this embodiment, the set of identifiers comprises a set of continuously incrementing or decrementing numeric values.

In a variation on this embodiment, the router further comprises a response-receiving module configured to receive a response to the interest, a response-processing module configured to process the received response, and a response-forwarding module configured to forward the processed response. While processing the received response, the response-processing module is configured to: identify a matching entry in a local routing table based on a response identifier carried by the response, with the matching entry specifying a third router that forwards the interest to the router; map the response identifier to a response-forwarding identifier using a function specific to the third router; and generate the processed response by replacing the response identifier with the response-forwarding identifier.

BRIEF DESCRIPTION OF THE FIGURES

FIG. 2 presents a diagram illustrating an exemplary Forwarding Information Base (FIB), in accordance with an embodiment of the present invention.

FIG. 3 presents a diagram illustrating an exemplary Local Interests Gathered Table (LIGHT), in accordance with an embodiment of the present invention.

FIG. 4 presents a diagram illustrating an exemplary Anonymous Routing Table (ART), in accordance with an embodiment of the present invention.

FIG. 5 presents a diagram illustrating an exemplary Local Interval Set Table (LIST), in accordance with an embodiment of the present invention.

FIG. 11 presents a diagram illustrating an exemplary Interest-processing algorithm, in accordance with an embodiment of the present invention.

FIG. 12 presents a diagram illustrating an exemplary Interest-processing algorithm, in accordance with an embodiment of the present invention.

FIG. 13 presents a diagram illustrating an exemplary algorithm for processing Data packets, in accordance with an embodiment of the present invention.

FIG. 14 presents a diagram illustrating an exemplary algorithm for processing NACKs, in accordance with an embodiment of the present invention.

In the figures, like reference numerals refer to the same figure elements.

DETAILED DESCRIPTION

Overview

Figure 1:
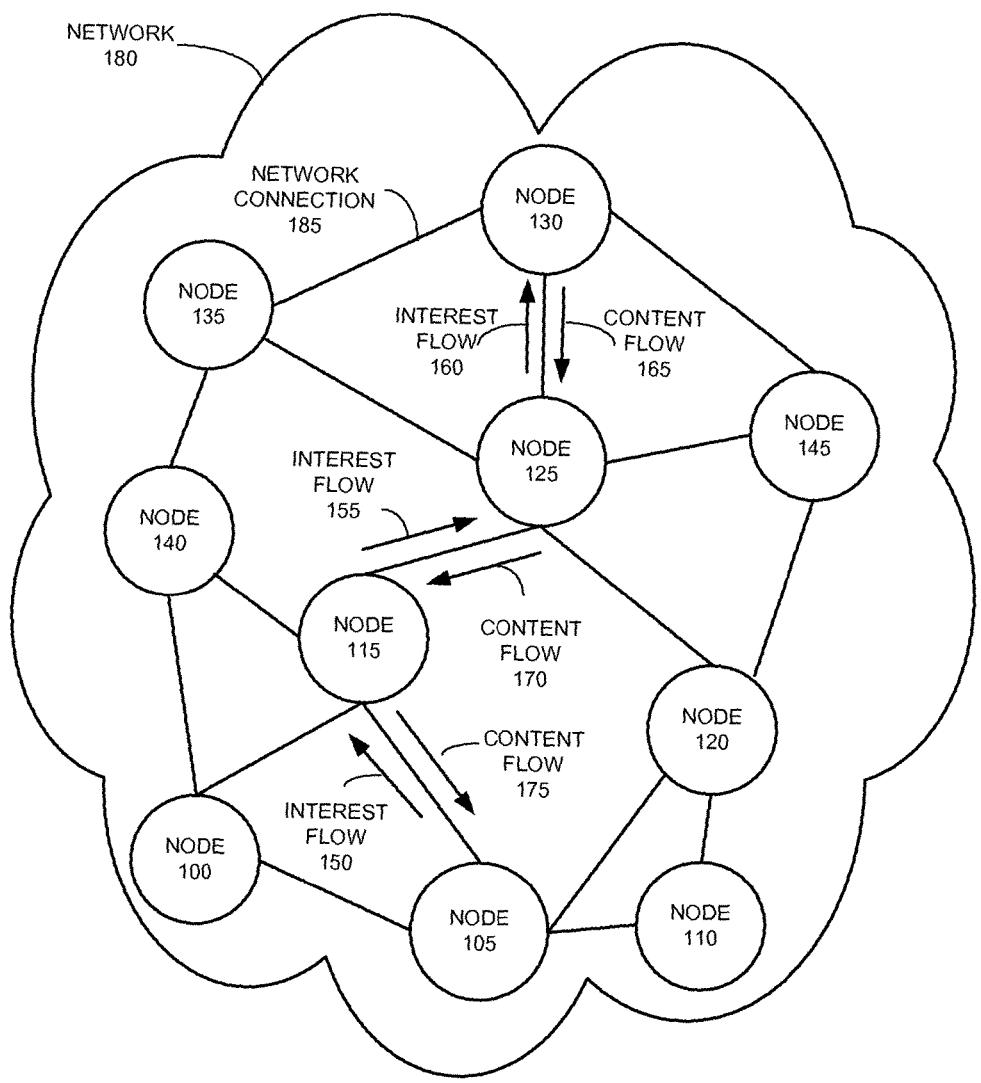
FIG. 1 illustrates an exemplary architecture of a network, in accordance with an embodiment of the present invention.

Embodiments of the present invention provide a novel CCN system, CCN-Gathering of Routes for Anonymous Messengers (CCN-GRAM). Routers implementing CCN-GRAM no longer need to maintain a Pending Interest Table (PIT). More specifically, CCN-GRAM operates with a stateless forwarding plane by forwarding Interests and responses to them as anonymous datagrams using destination-based forwarding tables. Each router assigns intervals to its neighbors and receives interval assignments from its neighbors, with each interval being a set of continuous identifiers. When a router forwards an Interest, it selects an identifier from the interval assigned by the receiver of the Interest to label the Interest. This label is changed on a hop-by-hop basis. The mapping between the previous hop of the Interest and the identifier used for forwarding the Interest is maintained at a local routing table to ensure that response to the Interest can be correctly forwarded back along the reverse path of the Interest. In addition, CCN-GRAM also uses a distance-based forwarding strategy to prevent Interest looping.

CCN Architecture

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also, the HSVLI may not be human-readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and, optionally, other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. In this disclosure, the term "Content Object" and the term "Named Data Object (NDO)" are exchangeable.

"Face:" In CCN, the term face is a generalization of the concept of an interface. A face may be a connection to a network or directly to an application party. A face may be configured to send and receive broadcast or multicast packets on a particular network interface, or to send and receive packets using point-to-point addressing in the underlying transport, or using a tunnel (for example a TCP tunnel). A face may also be the connection to a single application process running on the same machine, via an encapsulation like UDP or an OS-specific inter-process communication path. All messages arrive through a face and are sent out through a face. In this disclosure, the term "neighbor" is interchangeable with the term "face," referring to an incoming or outgoing interface of an Interest.

"Prefix:" In this disclosure, the term "prefix" can be used to refer to either a name of a specific content object or a name prefix for the content object.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message, thus reaching the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

In conventional CCNs, each node (also called as a router) maintains three major data structures, including a Forwarding Information Base (FIB), a Content Store (CS), and a Pending Interest Table (PIT).

FIB is used to forward Interest packets toward potential source(s) of matching Content Objects. Typically, a routing protocol is used to populate the FIB among all nodes in the network. In conventional CCNs, the FIB entries are often indexed by the name prefixes, with each entry including a physical address of at least one face to which the matching Interest should be forwarded. While forwarding Interest messages, longest-prefix-match lookups of names are performed at the FIB to find a matching entry.

Content Store (CS) is similar to the buffer memory used in an IP router. More particularly, CS temporarily buffers Content Objects that pass through this node, allowing efficient data retrieval by different consumers. When a router receives an Interest packet, it first checks whether there is a matching Content Object in its content store prior to issuing an Interest upstream.

Pending Interest Table (PIT) serves as a cache of Interest state. The PIT keeps track of Interests forwarded upstream toward content source(s) so that a returned Content Object can be sent downstream following the reverse Interest path to its requester(s). This preserves upstream and downstream network flow. In CCN, only Interest packets are routed. The returning Content Object follows the trail of the Interest packet back to the content requester. A PIT entry for an Interest specifies the name or name prefix of the Interest and one or multiple incoming faces that requested that Interest.

When an Interest packet arrives on a certain face, a longest-match lookup is done based on the content name, or the HSVLI. The index structure used for the name lookup is ordered in such a way that a CS match will be preferred over a PIT match, which will be preferred over an FIB match. Hence, if there is already a Content Object in CS that matches the Interest, the Content Object will be sent out via the face the Interest arrived on and the Interest will be discarded. Otherwise, the PIT will be checked to see if a match can be found. If so, the Interest's arrival face will be added to the PIT entry's requesting face list and the Interest will be discarded. Otherwise, the FIB will be checked and the Interest is forwarded along the one or more faces listed in the matching FIB entry.

CCN-GRAM: Information Exchanged and Stored

As discussed previously, current ICNs (e.g., CCN or NDN) use a stateful forwarding plane, meaning that routers maintain the forwarding state for each Interest. However, this does not solve all the problems of a stateless forwarding plane, which does not maintain the forwarding state for each Interest traversing a router. It has been shown that Interest aggregation may cause Interests to traverse forwarding loops. The looping Interests may never receive responses, because they are unable to reach a router with a local content producer or cached content. As a result, these Interests will need to stay in the PIT until they time out. In addition to Interest-looping, temporary inconsistencies among the FIBs of various routers can also result in Interests "waiting to infinity" in PITs just like old routing protocols "count to infinity" in the control plane. This can lead to much longer latencies and congestion.

More importantly, using PITs to remember how to forward the response to each unsolicited Interest makes routers vulnerable to new types of attacks not present in a stateless forwarding plane, including Interest flooding attacks in which adversaries send malicious Interests aimed at making the size of PITs explode. No complete solution exists to these attacks today.

Traditional network protocols, e.g., Internet Protocol (IP) and Ethernet protocol, use datagram forwarding, which constitutes a "stateless" forwarding plane approach. For example, in an IP network, content dissemination is based on headers (as defined by application and transport protocols) encapsulated on IP datagrams. Compared to NDN and CCN, IP datagram forwarding incurs far less storage overhead in the forwarding plane and is not subject to attacks aimed at overflowing forwarding tables. However, with IP datagrams, the sources are denoted with globally unique identifiers carried by the datagrams. Simple adoption of IP datagrams in NDN or CCN can be vulnerable to attacks mounted by creating fictitious sources. Content requests and responses to them can traverse diverse paths, and there is no coordination among these paths, which makes forwarding more complex than necessary.

To obtain benefits of both the Interest-based ICN and the datagram forwarding, in some embodiments of the present invention, a new approach, namely CCN-Gathering of Routes for Anonymous Messengers (CCN-GRAM), is used. CCN-GRAM operates with a stateless forwarding plane by forwarding Interests and responses to them as anonymous datagrams using destination-based forwarding tables. To facilitate the stateless forwarding, a proactive routing approach is used by routers to establish and maintain routes to known name prefixes. A novel on-demand routing approach is also used to maintain anonymous routes to the routers originating Interests for specific content on behalf of content consumers. To hide the identities of the content consumers, only the local router serving a user knows the identity of the user; no other router, content provider, or caching site can identify the router originating an Interest on behalf of the user.

During operation, CCN-GRAM uses Interests, Data packets, and certain control messages (such as negative acknowledgments (NACKs)), to implement the exchange of content among nodes. Similar to IP datagrams, the messages sent in CCN-GRAM specify a source and a destination. For an Interest, the destination can be the name of a content object (e.g., NDO), and the source can be an anonymous identifier. For Data packets and NACKs, the source can be the name of an NDO, and the destination can be an anonymous identifier.

An Interest sent by a node k requesting a Content Object (CO) n(j) is denoted $I[n(j), AID^I(k)]$, which states the name of the requested CO (n(j)) and an assigned identifier ($AID^I(k)$) that is modified on a hop-by-hop basis to hide the identity of the origin of the Interest. In some embodiments, the assigned identifier can be included in a header field of the Interest packet, in a way that is similar to an IP address being part of the header of an IP datagram. But different from the IP datagram, this assigned identifier (AID) does not reveal the identity (or address) of the router originating the Interest.

A Data packet sent by router i in response to an Interest is denoted as $DP[n(j), sp(j), AID^R(i)]$, which states the name (n(j)) of the CO being sent, a signature payload (sp(j)) used to optionally validate the CO, and an assigned identifier ($AID^R$ (i)) that denotes the intended recipient of the Data packet, without revealing its true identity. On the other hand, the control message (NACK) sent by router i in response to an Interest is denoted as NA[n(j), CODE, $AID^R$ (i)], where CODE states the reason for sending the NACK. Possible reasons for sending a NACK include: (a) an Interest loop is detected, (b) no route is found toward the requested content, and (c) no content is found.

To implement the forwarding of Interests, COs and NACKs, a GRAM router maintains a forwarding information base, an optional Local Interests Gathered Table (LIGHT), an Anonymous Routing Table (ART), and a Local Interval Set Table (LIST).

FIG. 2 presents a diagram illustrating an exemplary Forwarding Information Base (FIB), in accordance with an embodiment of the present invention. The FIB of each router states the distance to each known name prefix attained by each neighbor router. In FIG. 2, FIB 200 includes a number of entries indexed using content name prefixes. Each entry states the next hop to the content identified by the name prefix and a hop count to the node advertising the name prefix. For notation purposes, at router i, the FIB is denoted as $FIB^i$, and each FIB entry for a name prefix n(j)* is denoted as $F/B_{n(j)*}^i$, such as FIB entry 202. Note that each FIB entry may include a list of distances, one for each next hop neighbor. The set of next hops to n(j)* listed in the $F/B_{n(j)*}^i$ is denoted as $S_{n(j)*}^i$. For each next hop q, ($q \in S_{n(j)*}^i$), the distance (e.g., hop count) to a name prefix n(j)* through neighbor q is denoted as D(i,n(j)*,q). Each entry in $FIB^i$ is stored for a maximum time determined by the lifetime of the corresponding entry in the routing table of the router. In some embodiments, a FIB entry for a particular next hop can also include the ranking of the next hop among all neighbors.

FIG. 3 presents a diagram illustrating an exemplary Local Interests Gathered Table (LIGHT), in accordance with an embodiment of the present invention. The LIGHT of a router is an index of content locally available, as well as content that is remote and has been requested by local users. More specifically, the LIGHT stored at router i($LIGHT^i$) lists the names of the COs requested by router i or already stored at router i. In FIG. 3, LIGHT 300 includes a number of entries indexed by the CO names. Each entry, such as entry 302, states the name of a CO, a pointer to the CO, and a list of local consumers that have requested the CO while the content is remote. For example, entry 302 states the name of the CO (n(j)), a pointer to n(j) (p[n(j)]), and a list of identifiers (lc[n(j)]) that identify the local consumers. If there is no local consumer for a CO, the list of identifiers will be empty. Note that only routers that have local caches and local content consumers are required to maintain LIGHTs; relay routers, on the other hand, do not need to maintain LIGHTs.

FIG. 4 presents a diagram illustrating an exemplary Anonymous Routing Table (ART), in accordance with an embodiment of the present invention. The ART is maintained on-demand using Interests and states the paths to destinations denoted with local identifiers. Because those identifiers are local, routers cannot discern the origin of Interests using such identifiers. In FIG. 4, ART 400 at router i ($ART^i$) includes a number of entries, such as entries 402 and 404, indexed using assigned identifiers. Each entry states an assigned identifier, a previous hop, and possibly a name prefix (for locally generated Interests). For notation purposes, $ART^i$ (a, p, n) is used to denote the entry for assigned identifier a, previous hop p, and name prefix n. In FIG. 4, entry 402 is an entry created for an assigned identifier $a_I$ as a result of router i being the origin of Interests for COs with names that are best matched by name prefix n(j)*. Entry 402 can state the assigned identifier ($a_1$), the previous hop (router i), and the matching prefix (n(j)*). On the other hand, entry 404 is an entry created for an assigned identifier $a_k$ as a result of router i forwarding Interests received from another router. Entry 404 can state the assigned identifier $a_k$ and the previous hop ($p^i(a_k)$) of the Interests, to which router i assigns identifier $a_k$. The name prefix in entry 404 is set as empty. Each entry in $ART^i$ is stored for a maximum lifetime of a few seconds.

FIG. 5 presents a diagram illustrating an exemplary Local Interval Set Table (LIST), in accordance with an embodiment of the present invention. A LIST maintained at a router states the intervals of local identifiers that the router assigns to its neighbors and that each neighbor assigns to the router. In some embodiments, each local interval is a chunk of continuously incrementing or decrementing numerical identifiers. For example, a local interval assigned by one router to one of its neighbors can be a set of identifiers that starts from 1 and ends at 50. In FIG. 5, LIST 500 includes a number of entries, such as entry 502, indexed using faces of a router. Each entry states the interval of local identifiers (local interval) assigned to the current router by a neighbor (face), as well as the local interval assigned to the neighbor by the current router. For notation purposes, $LIST^i$ denotes the LIST maintained at router i, $LI^i$ (k,i) denotes the local interval assigned to router i by neighbor k, and $LI^i$ (i,k) denotes the local interval assigned to router k by neighbor i.

CCN-GRAM: Loop-Free Forwarding

CCN-GRAM implements a distance-based loop-free forwarding rule (LFR) to ensure that Interests cannot traverse routing loops, even if the routing data stored in FIBs regarding name prefixes is inconsistent and includes routing-table loops. More specifically, a router accepts an Interest from a neighbor only if the router determines that it is closer to the prefix through at least one interface than the neighbor is when the neighbor forwards the Interest. A detailed description of the distance-based forwarding strategy that can be used to prevent Interest loops can be found in the co-pending patent application Ser. No. 14/572,608, entitled "SYSTEM AND METHOD FOR DISTANCE-BASED INTEREST FORWARDING," by inventor Jose J. Garcia-Luna-Aceves, filed 16 Dec. 2014, the disclosure of which is incorporated herein by reference in its entirety.

When routers implementing CCN-GRAM receive Interests, they first determine whether to accept the Interests based on a loop-free forwarding rule (LFR), which states that a router i can accept an Interest I[n(j),$AID^I$ (k)] from a neighbor k if the following condition is satisfied:

$$\exists v \in N^i (D(i,n(j)*,k) > D(i,n(j)*,v).$$

Figure 6A:
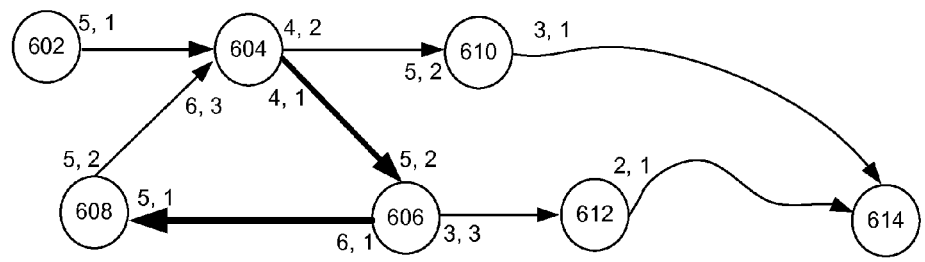
FIGS. 6A-6B illustrate how CCN-GRAM detects Interest loops, according to an embodiment of the present invention.
Figure 6B:
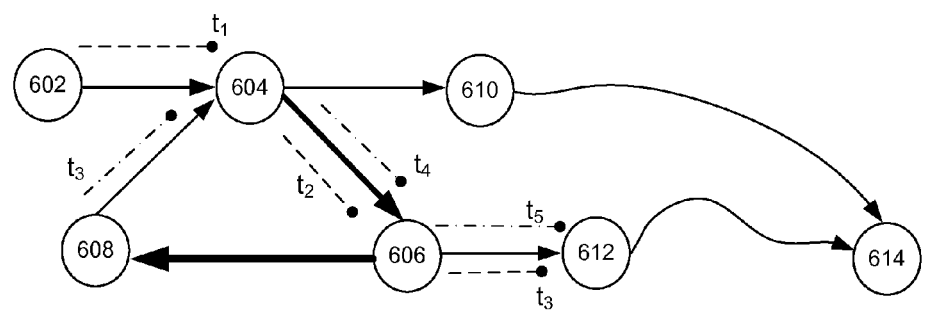

FIGS. 6A-6B illustrates how CCN-GRAM detects Interest loops, according to an embodiment of the present invention. As shown in FIG. 6A, network 600 includes a number of nodes 602-614. Multiple paths exist between nodes 602 and 614, and the routing table may include a loop: node 604-node 606-node 608-node 604. In FIG. 6A, at each link outgoing from a router to its neighbors, a pair of numbers is listed, indicating a hop count (the first number) through the neighbor to n(j) (node 614) and the ranking of the neighbor according to the FIB (the second number). Note that for the same link there might be two pairs, and each pair is stored at the FIB in the router that is closer to the pair. For example, on the link from router 604 to router 606, two number pairs, pair (4, 1) and pair (5, 2), are shown next to the link. Number pair (4, 1) is adjacent to router 604 and is stored in the FIB of router 604, and number pair (5, 2) is adjacent to router 606 and is stored in the FIB of router 606. More specifically, the number pair (4, 1) adjacent to router 604 indicates that the hop count to n(j) via its neighbor 606 is 4, and neighbor 606 ranks number 1 in the FIB of router 604. On the other hand, the number pair (5, 2) adjacent to router 606 indicates that the hop count from its neighbor 604 to n(j) is 5, and neighbor 604 ranks number 2 in the FIB of router 606.

For notation purposes, a tuple (v, h, r) can be used to indicate a neighbor, its hop count to content, and its ranking. Note that such a tuple can be entries listed in the FIB under name prefix n(j)*. For example, $FIB^{node\ 604}$ can list tuples (node 606, 4, 1), (node 610, 4, 2), and (node 608, 6, 3). Similarly, $FIB^{node\ 602}$ can list a tuple (node 604, 5, 1); $FIB^{node\ 606}$ can list tuples (node 608, 6, 1), (node 604, 5, 2), and (node 612, 3, 3); and $FIB^{node\ 608}$ can list tuples (node 606, 5, 1) and (node 604, 5, 2). Note that partial FIB entries for nodes 610 and 612 are also shown in FIG. 6A.

FIG. 6B illustrates how CCN-GRAM routers forward Interests. In the example shown in FIG. 6B, router 604 received an Interest $I[n(j), AID^I]$ for name n(j) from router 602 at time $t_1$. According to the FIB stored at node 604, 5=D(node 604, n(j)*, node 602)>D(node 604, n(j)*, node 606)=3 (which satisfies the LFR) and router 606 is ranked higher than router 610. Consequently, router 604 accepts the Interest and forwards it to router 606. Router 606 receives the Interest at time $t_2$, and accepts it because 4=D(node 606, n(j)*, node 604)>D(node 606, n(j)*, node 612)=2. Router 606 then uses router 612 as the next hop for the Interest because router 612 is the highest-ranked neighbor that satisfies the LFR. The route traversed by the Interest is indicated by a dashed line following time sequence $t_1 \rightarrow t_2 \rightarrow t_3$.

Similarly, the Interest generated by router 608 is forwarded to router 612 toward n(j) (the route is indicated by a different dashed line following time sequence $t_3 \rightarrow t_4 \rightarrow t_5$) without traversing a loop, because each relaying router must satisfy the LFR.

Figure 7A:
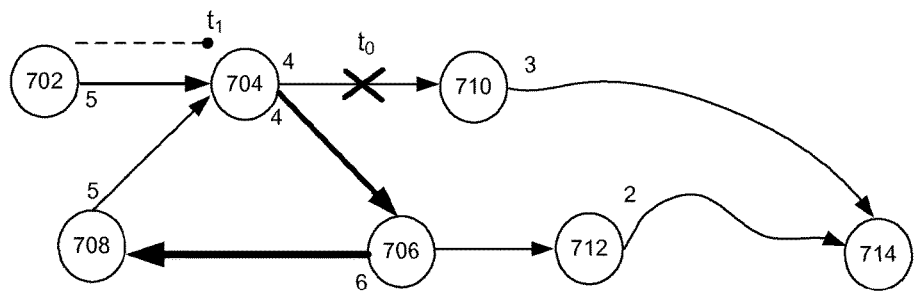
FIGS. 7A-7C illustrate how CCN-GRAM operates with single-path routing and a temporary routing-table loop, according to an embodiment of the present invention.
Figure 7B:
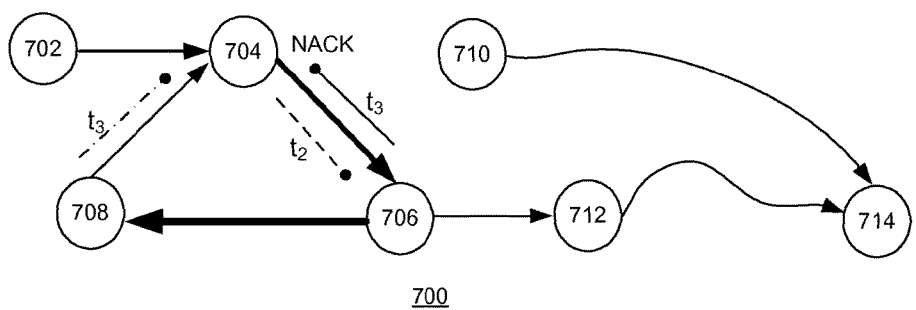
Figure 7C:
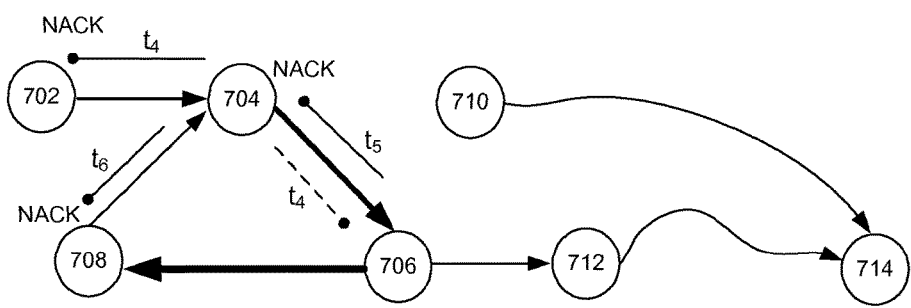

FIGS. 7A-7C illustrate how CCN-GRAM operates with single-path routing and a temporary routing-table loop, according to an embodiment of the present invention. In the figures, network 700 includes a number of nodes 702-714. In FIG. 7A, each router has a single next hop and one hop count for each prefix listed in its FIB. For example, for a name prefix n(j)* advertised by router 714, router 704 lists a hop count of 4 via neighbor router 710 (before the link (node 704, node 710) fails), and router 706 lists a hop count of 6 via neighbor router 708. Note that the distance from a router to name prefix n(j)* may not be directly proportional to the hop counts of the paths. For example, link (node 706, node 712) may have limited bandwidth or long delays; hence, node 706 may prefer the path through node 708 to reach n(j)* at node 714.

When the link between router 704 and router 710 fails, router 706 updates its FIB to reflect the link failure at time $t_0$, as shown in FIG. 7A. Router 704 now lists a hop count of 4 via neighbor router 706. Note that such a link failure results in routers in network 700 having inconsistent FIB states for n(j) while Interests are being forwarded. For example, router 706 has not yet updated its FIB, which can lead to a temporary routing table loop. At time $t_1$, router 702 sends an Interest $I[n(j), AID^I]$ to router 704. FIG. 7B shows that router 704 forwards the Interest to router 706 at time $t_2$. FIG. 7B also shows that router 706 responds to the Interest with a NACK at time $t_3$, because 4=D(node 706, n(j)*, node 704) h(node 706, n(j)*, node 708)=6, which violates the LFR. The NACK will indicate the reason for the NACK as loop detected. The NACK will eventually be forwarded to the originator of the Interest, router 702, at time $t_4$, as shown in FIG. 7C.

FIG. 7B also shows that, at time $t_3$, router 708 sends an Interest for name n(j) to router 704. Such an Interest also prompts a NACK from router 706 at time $t_5$ due to LFR violation, as shown in FIG. 7C. FIG. 7C also illustrates that router 704 forwards the NACK from router 706 to router 708 at time $t_6$. Within a finite time, $FIB^{node\ 704}$, $FIB^{node\ 706}$, and $FIB^{node\ 708}$ are updated to reflect the new topology state. More specifically, the FIB for node 706 may no longer list node 708 as its next hop, and Interests from node 702 regarding n(j)* can be forwarded along the chain of nodes 704, 706, and 712 toward n(j)*, i.e., node 714. Similarly, within a finite time, Interests from node 708 regarding n(j)* can be forwarded to nodes 706 and 712 toward n(j)*.

CCN-GRAM: Forwarding to Anonymous Destinations

To forward Data packets and NACKs using a destination-based forwarding table approach, routers need identifiers that can unambiguously denote the intended destinations. In contrast to IP datagram forwarding, however, in CNN, the destinations must be anonymous such that no forwarding router, caching site, or content producer can identify the router that originated the Interest prompting a Data packet or NACK.

The identifiers used in Interests could be nonces assigned randomly by an originating router of the Interests, and the name space for such nonces can be large enough to ensure a small probability of collision (i.e., more than one router using the same nonce). However, such a sender-initiated approach for assigning identifiers has several drawbacks. First, it may allow a team of routers to find out the identities of some origins of Interests. Second, it can be subject to attacks based on the creation of fake identifiers. Third, the length of the identifiers needs to be large enough to reduce collisions.

To avoid such drawbacks, CCN-GRAM adopts a novel receiver-initiated approach by assigning local identifiers that can be used to forward Data packets and NACKs. This approach takes advantage of the fact that Data packets and NACKs are sent over the reverse paths traversed by the prompting Interests.

In CCN-GRAM, each router has a large set of local identifiers that it can assign to its neighbors, so that the neighbors can in turn use such identifiers as the assigned identifiers (AIDs) carried in the Interests they forward to the router. In some embodiments, a router assigns non-overlapping continuous local intervals of identifiers (local intervals) of equal length to its neighbors, such that a router cannot give the same local identifier to more than one neighbor. In other words, a router can use the local intervals to unambiguously identify its neighbors. Given that all local intervals have the same length (i.e., same number of identifiers are included in each interval), a local interval is uniquely defined by the identifier at the start of the interval. The local intervals assigned to its neighbors as well as the local intervals assigned to the router by its neighbors are stored in the LIST of the router.

For simplicity of description, it can be assumed that routers have exchanged their neighbor intervals and have populated their LISTs accordingly, and local intervals do not change for extended periods of time after they are assigned. Routers can exchange local intervals with their neighbors in a number of ways. In some embodiments, this exchange can be done in the data plane using Interests and Data packets.

For example, a router sends an Interest stating a common name denoting that a neighbor interval is requested, and an empty AID. On the other hand, given the succinct way in which local intervals can be stated (an identifier denotes its interval), the exchange can also be easily done as part of the routing protocol running in the control plane. For example, routers could exchange interval identifiers in HELLO messages, link-state advertisements, or distance updates.

When router i originates an Interest regarding CO n(j) on behalf of a local consumer, it can send an Interest I[n(j), $AID^I$ (i)] to neighbor k toward name prefix n(j)*. The identifier ($AID^I$ (i)) carried by this Interest can include an identifier from $LI^i$ (k,i) that it is assigned by router k and is not currently used for a different destination. After selecting $AID^I$ (i), router i can store the entry [A/$D^I$ (i),i] in $ART^i$ and adds the prefix name n(j)* to such an entry.

On the other hand, when router k forwards the Interest I[n(j), $AID^I$ (i)] received from router i to neighbor y, router k can replace the identifier carried in the Interest ($AID^I$ (i)) with its own identifier ($AID^I$ (k)). In some embodiments, such an identifier can be selected from the interval $LI^k$ (y,k) using $AID^I$ (i) as the key. Given that all local intervals are of the same length, router k can use any one-to-one mapping from $LI^k$ (k,i) to $LI^k$ (y,k) to determine the value of $AID^I$ (k). This mapping can be denoted as a function $f_k$ (i,y): $LI^k$ (k,i)→$LI^k$ (y,k). After selecting $AID^I$ (k), router k can store the entry [$AID^I$ (k), i] in $ART^k$.

When router k forwards the Data packet DP[n(j), sp(j), $AID^R$ (y)] received from neighbor y, it can use $AID^R$ (y) as a key in its own ART ($ART^k$) to determine the next hop x (listed in the ART as the previous hop for the Interest) that the Data packet should be sent to. Given the next hop x, router i uses the inverse function $f_k^{-1}$(x, y) to map $AID^R$ (y)∈$LI^k$ (y,k) into $AID^R$ (k)∈$LI^k$ (k,x), and forwards DP[n(j), sp(j), $AID^R$ (k)] to router x. The same approach can be used for forwarding NACKs.

Many bijections can be used by routers to map identifiers from one local interval to another. For example, an identifier i in local interval LI is denoted by LI (i). Let two local intervals be $LI_A$=[$LI_A$(start), $LI_A$(end)] and $LI_B$[$LI_B$(start), $LI_B$(end)], where LI(start) and LI(end) are the starting and ending points of a respective local interval; a simple way to obtain an identifier $AID_B$∈$LI_B$ from an identifier $AID_A$∈$LI_A$ is to compute $AID_B$=$AID_A$−$LI_A$(s)+$LI_B$(s) modulo the length of an interval. The inverse function can be the same.

Note that once a router originates an Interest using a given local identifier, there should be no collision with identifiers created by other originating routers. This is because each router uses a new AID when it originates an Interest for a new destination and uses a bijection (i.e., one-to-one correspondence) to map the AID in a received Interest into the AID in the forwarded Interest. The AID in the forwarded Interest must be one of the identifiers within the local interval given to the router by its next hop.

Figure 8:
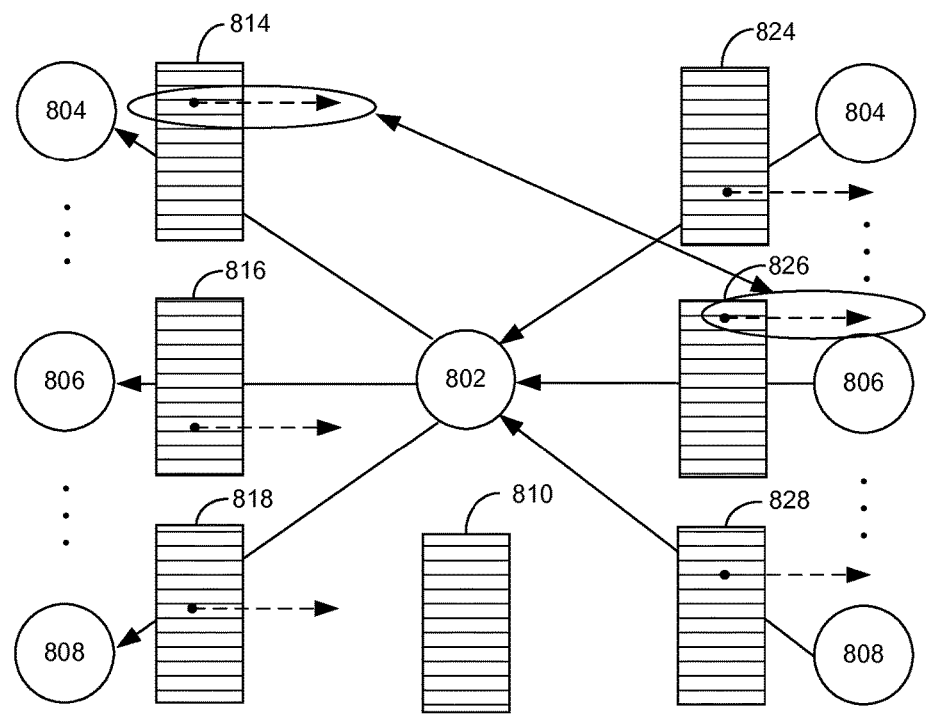
FIG. 8 presents a diagram illustrating the mapping of assigned identifiers (AIDs) in Interests, in accordance with an embodiment of the present invention.

FIG. 8 presents a diagram illustrating the mapping of AIDs in Interests, in accordance with an embodiment of the present invention. In FIG. 8, a router 802 includes a number of neighboring routers, such as routers 804, 806, and 808. The LIST at router 802 includes the intervals assigned to neighboring routers 804, 806, and 808 by router 802, as well as the intervals assigned to router 802 by its neighbors. Each interval includes a chunk of continuous identifiers, as indicated by the hatched rectangles. The solid arrows indicate the assignment direction of the intervals. For example, an arrow that points from router 802 to router 804 indicates that interval 814 in the path of the arrow represents a set of continuous identifiers assigned to router 804 by router 802, and can be denoted as $LI^{node\ 802}$ (node 802, node 804). Similarly, intervals 816 and 818 represent the sets of continuous identifiers assigned to routers 806 and 808, respectively, by router 802, and can be denoted as $LI^{node\ 802}$ (node 802, node 806) and $LI^{node\ 802}$ (node 802, node 808), respectively. FIG. 8 also illustrates intervals 824, 826, and 828, which are intervals assigned to router 802 by its neighbors 804, 806, and 808, respectively. They are denoted as $LI^{node\ 822}$ (node 804, node 802), $LI^{node\ 802}$ (node 806, node 802), and $LI^{node\ 802}$ (node 808, node 802). Identifiers in these intervals can be used by the routers to forward Interests. The dashed arrows pointing out of the intervals indicate that the identifiers inserted into the Interests are selected from the corresponding intervals. For example, when router 802 receives an Interest from router 804, the Interest should include an assigned identifier (AID) selected from interval 814 ($LI^{node\ 802}$ (node 802, node 804)). When router 802 forwards the received Interest to router 806, it needs to map the received AID∈$LI^{node\ 802}$ (node 802, node 804) to an AID∈$LI^{node\ 802}$ (node 806, node 802), and replace the identifier in the received Interest with the mapped identifier. The double arrow in FIG. 8 indicates the mapping between the two AIDs. In some embodiments, router 802 uses the received AID as an input to a bijection function to map the AID in the received Interest to the AID in the forwarded Interest. This mapping can be stored in the ART of router 802. When router 802 receives a response to the Interest, it can use entries in its ART to determine the inverse function to use on the AID in the received response.

In addition to intervals assigned to or assigned by its routers, router 802 can also reserve an interval 810 for itself, denoted as $LI^{node\ 802}$ (node 802, node 802). The identifiers in this interval are used by router 802 for locally generated Interests, i.e., Interests generated by router 802 on behalf of its local consumers.

Figure 9:
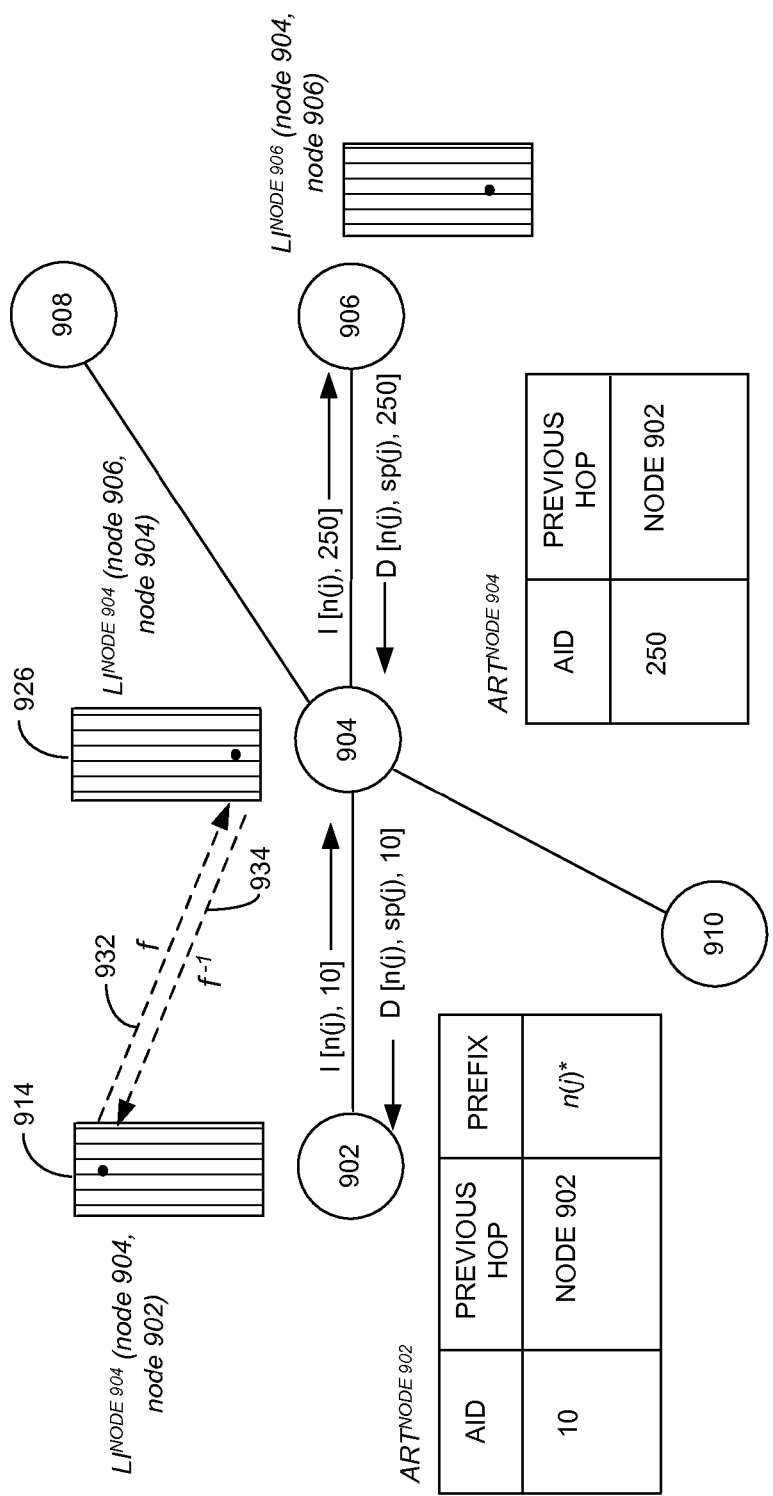
FIG. 9 presents a diagram illustrating the mapping of AIDs in responses to Interests, in accordance with an embodiment of the present invention.

FIG. 9 presents a diagram illustrating the mapping of AIDs in responses to Interests, in accordance with an embodiment of the present invention. In FIG. 9, a router 902 originates an Interest for CO n(j). More specifically, to send the Interest toward n(j)* via router 904, router 902 selects from the interval assigned to it by router 904 an $AID^I$ (node 902)=10, uses this AID in the forwarded Interest, and stores the entry [10, node 902] in its ART. When router 904 receives the Interest, it identifies router 906 as the next hop, uses a bijection mapping function to map the AID in the received Interest (which belongs to interval 914) to an identifier selected from the interval assigned by router 906 to router 904 (interval 926). Dashed arrow 932 indicates such mapping. Router 904 uses the selected identifier as an $AID^I$ (node 904)=250 to replace the AID in the received Interest, forwards the Interest to router 906, and stores the entry [250, node 902] in its ART. Similarly, router 906 may perform a similar mapping based on its own LIST (if it decides to forward the Interest) or send a response (e.g., a Data packet or a NACK) to the Interest.

When router 904 receives a Data packet from router 904 with $AID^R$ (node 906)=250, it checks its ART for a matching entry. The ART entry indicates that the previous hop is node 902; hence router 904 should use the inverse mapping function for router 902. The inverse mapping can result in mapping $AID^R$ (node 906)=250 to $AID^R$ (node 904)=10, as indicated by dashed arrow 934. Router 904 can then replace the AID in the received Data packet with the mapped AID, and send the Data packet to router 902. Router 902 can determine, based on its ART, that the Data packet is for local consumers.

One can see from FIG. 9 that, even when a very small number of routers is involved, only the router that originates an Interest is able to determine the originator of the Interest. This is because the identifiers used for forwarding responses over reverse paths traversed by Interests are assigned by the receivers of the Interests at each hop. The role of the announced identifiers is also clear: they are only an aid for a router to select the inverse function to use when it forwards Data packets or NACKs.

CCN-GRAM: Router Architecture

Figure 10:
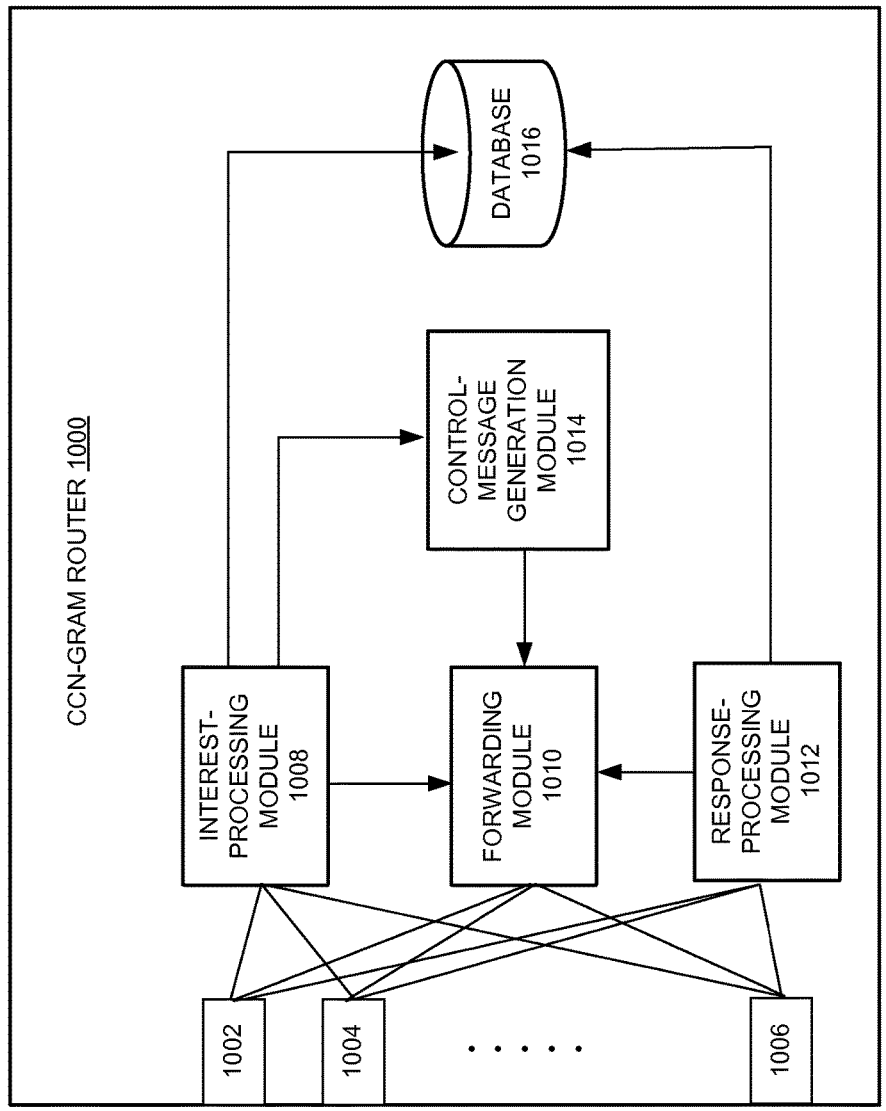
FIG. 10 presents a diagram presenting an exemplary architecture of a CCN-GRAM router, in accordance with an embodiment of the present invention.

FIG. 10 presents a diagram presenting an exemplary architecture of a CCN-GRAM router, in accordance with an embodiment of the present invention. In FIG. 10, CCN-GRAM router 1000 includes a number of faces, such as faces 1002, 1004, and 1006; an Interest-processing module 1008; a forwarding module 1010; a response-processing module 1012; a control-message generation module 1014, and a database 1016.

Faces 1002-1006 can include not only physical interfaces but also application processes capable of sending and receiving packets, including Interests Data packets, and NACKs. Interest-processing module 1008 is responsible for processing the Interests received on the various faces. In some embodiments, Interest-processing module 1008 determines whether to accept an incoming Interest based on the aforementioned loop-free forwarding rule (LFR). If the Interest is accepted, Interest-processing module 1008 uses the ART maintained in database 1016 to map the AID in the received Interest to a new AID, and swaps the AID included in the Interest based on the mapping. Forwarding module 1010 is responsible for forwarding packets, such as Interests, Data packets, or NACKs, to the faces. In some embodiments, forwarding module 1010 forwards the Data packets and NACKs based on the AID mapping. Control-message generation module 1014 generates control messages, which can include different NACK messages, when Interest-processing module 1008 rejects or drops an Interest. In some embodiments, control-message generation module 1014 generates NACK messages under various conditions, including but not limited to when: an Interest loop is detected, no route is found toward the requested content, and no content is found. Response-processing module 1012 is responsible for processing Data packets of NACKs received in response to Interests. In some embodiments, response-processing module 1012 checks the ART maintained in database 1016 to find an AID mapping, and swaps the AID included in the response based on the mapping. Database 1016 stores the data structures needed for CCN-GRAM operation: the FIB, the optional LIGHT, the ART, and the LIST.

CCN-GRAM: Maintaining Forwarding State

As in NDN and CCN, routers in CCN-GRAM maintain routes to those sites advertising themselves as the origins of name prefixes and populate their routing tables using a routing protocol operating in the control plane. Routers populate their FIBs with routes to name prefixes based on the data stored in their routing tables. The lifetime of the FIB entries is determined by the operation of the routing protocol. In the following discussion, it can be assumed that a multipath routing protocol is used to populate FIBs and that a router is able to know a hop-count distance from each neighbor router to each name prefix. This information can be stored in the FIB of a router. It is also assumed that each router is initialized properly, knows the identifiers used to denote local consumers, knows all its neighbors, and knows the local identifier intervals associated with each neighbor.

FIG. 11 presents a diagram illustrating an exemplary Interest-processing algorithm, in accordance with an embodiment of the present invention. In this example, the Interest is received from a local consumer, and the Interest states the name of the CO and the name of the local consumer. As shown in FIG. 11, when router i receives an Interest from local consumer c, it checks its LIGHT to determine if the requested content is stored locally or a request for the same content is pending. If the content is stored locally, a Data packet is sent back to the user requesting the CO (line 5 in FIG. 11). If a request for the same content is pending, the name of the user is added to the list of users that have requested the CO (line 7 in FIG. 11). It is assumed in this disclosure that a router advertising itself as the origin of a prefix must have all the COs associated with the prefix stored locally. If router i states that it is the origin of the name prefix n(j)* and a specific CO with a name that is in that prefix is not found locally, a NACK is sent back stating that the content was not found (line 11 in FIG. 11).

If the CO is remote and no FIB entry exists for a name prefix that can match n(j), a NACK is sent back stating that no route to the CO could be found (line 14 in FIG. 11). Otherwise, router i creates an entry for CO n(j) in its LIGHT (line 16 in FIG. 11) and forwards the Interest through the highest ranked neighbor in its FIB for the name prefix matching n(j) (lines 17-20 in FIG. 11). Various ranking mechanisms can be used to rank the neighbors, including a distributed or local algorithm. For example, the neighbors may be ranked based on the distance to the destination or the link performance.

When forwarding the Interest, router i also checks its ART to determine if an ART entry exists for the selected successor to which the Interest is forwarded. If so, the existing identifier in the ART entry is used to replace the identifier in the received Interest; otherwise, a new ART entry is created before the Interest is forwarded. The identifier in the new ART entry has not been used for any other ART entry created as a result of router i being the origin of Interests (line 20 in FIG. 11).

FIG. 12 presents a diagram illustrating an exemplary Interest-processing algorithm, in accordance with an embodiment of the present invention. Unlike FIG. 11, in FIG. 12, the Interest being processed by router i is received from a neighboring router k. Different from the algorithm shown in FIG. 11, when processing Interest received from a neighbor, router i no longer aggregates the Interest. Instead, router i can simply map the AID in the Interest received from the previous hop to the AID in the Interest forwarded to the next hop using a simple mapping function.

When router i receives a content request, it determines whether the requested content is cached locally. If so, a Data packet is sent back (line 6 in FIG. 12). If router i states that it is the origin of the name prefix n(j)* and the CO with name n(j) is not found locally, a NACK is sent back stating that the content could not be found (line 10 in FIG. 12). If the CO is remote and no FIB entry exists for n(j)*, then router i sends a NACK stating that no route could be found for the CO (line 12 in FIG. 12). Note that the AID in the aforementioned NACKs is the same AID in the received Interest.

Router i tries to forward the Interest to a next hop v to n(j)* (the best prefix match for n(j)) that satisfies the LFR. The highest-ranked router satisfying the LFR is selected as the successor for the Interest and router i (lines 15-16 in FIG. 12). The AID used in the forwarded Interest can be obtained by mapping (using a bijection function) the AID received from router k to the corresponding AID assigned to router i by the selected next hop v (line 17 in FIG. 12). If no entry in $ART^i$ exists for the same AID and previous hop k, a new ART entry is created. The entry is valid for any name prefix for which the same path and AID are used; hence, the name prefix of the entry is left empty (line 21 in FIG. 12). Router i then forwards the Interest by replacing the original AID with the mapped AID.

FIG. 13 presents a diagram illustrating an exemplary algorithm for processing Data packets, in accordance with an embodiment of the present invention. When router i receives a Data packet, it may optionally verify the signature and discard the Data packet if the verification fails (lines 3-4 in FIG. 13). Router i further determines (based on its ART entries) whether it has local users that requested the content. If so, the Data packet is sent to those consumers based on the information stored in the LIGHT (lines 6-8 in FIG. 13). If the Data packet is received in response to an Interest that was forwarded from neighbor k, as determined by the ART entries, router i uses the inverse mapping function to map the AID in the received Data packets to the AID in the Data packet forwarded to neighbor k (line 11 in FIG. 13). Router i can optionally store the data object if edge or on-path caching is supported.

FIG. 14 presents a diagram illustrating an exemplary algorithm for processing NACKs, in accordance with an embodiment of the present invention. When router i receives a NACK, it determines (based on its ART entries) whether it was the origin of the Interest. If so, the NACK is sent to the local consumers based on the information stored in the LIGHT (lines 4-6 in FIG. 14). If the Data packet is received in response to an Interest that was forwarded from neighbor k, as determined by the ART entries, router i uses the inverse mapping function to map the AID in the received NACK to the AID in the NACK forwarded to neighbor k (line 9 in FIG. 14).

As discussed previously, CCN-GRAM uses local identifiers carried in Interests to map routes traversed by Interests, thus eliminating the need to maintain large PITs. To ensure that the routes from consumers to producers and producers to consumers remain completely anonymous, the assignment of these local identifiers are carefully designed. More superficially, a receiver-initiated approach is used for the assignment of local identifiers.

CCN-GRAM can use the same content security features adopted in CCN and NDN to limit or eliminate cache-poisoning attacks, because it makes no modifications to the way in which content is protected in Data packets or how a name can be securely linked to the payload of a CO. In addition, CCN-GRAM enjoys an enormous advantage over CCN and NDN in that it eliminates the ability of malicious users to mount Interest flooding attacks aimed at overwhelming the forwarding tables of routers. In CCN-GRAM, intruders would have to compromise routers originating Interests destined to an unbounded number of prefixes. Even this case can be managed, given that a router forwarding Interests to a neighbor router must obtain the AIDs to be used in those Interests from its neighbor.

Instead of using a PIT, a CCN-GRAM router uses an ART to maintain Interest state. Using ARTs to maintain the forwarding states of Interests shows greater advantages over the approach that keeps the per-Interest forwarding state in the PIT, especially when the rate of content requests is high. The size of the PITs can grow dramatically as the rate of content requests increases, whereas the size of the ARTs can remain substantially constant with respect to the content request rates. In fact, when the content request rate is low, the average number of entries in the ARTs may be larger than the average number of entries in the PITs. This is because ART entries are kept for long periods of time (e.g., seconds) regardless of whether or not the routes they denote are actually used by Interests and their responses. On the other hand, a PIT entry is deleted immediately after the corresponding Interest is satisfied. However, as the content request rate increases, the size of a PIT can be more than 10 to 20 times the size of an ART, because a given ART entry can be used for many Interests, whereas a different PIT entry is needed for each Interest. In general, it can be expected that the cost of maintaining ART entries that may not be used at light loads can be compensated for by the significant reduction in the signaling delays derived from many Interests forwarded using existing ART entries at high loads. The size of an ART is independent of where content is being cached, given that an ART entry is stored independently of how many Interests traverse the route. The size of a LIGHT, on the other hand, is a function of the number of COs requested locally or cached on the path, and the average size of a LIGHT is dominated by local requests. CCN-GRAM routers also maintain a LIST, and the average size of the LISTs is determined by the number of routers in the network, which is typically numbers of magnitude smaller than the number of Interests.

Computer and Communication System

Figure 15:
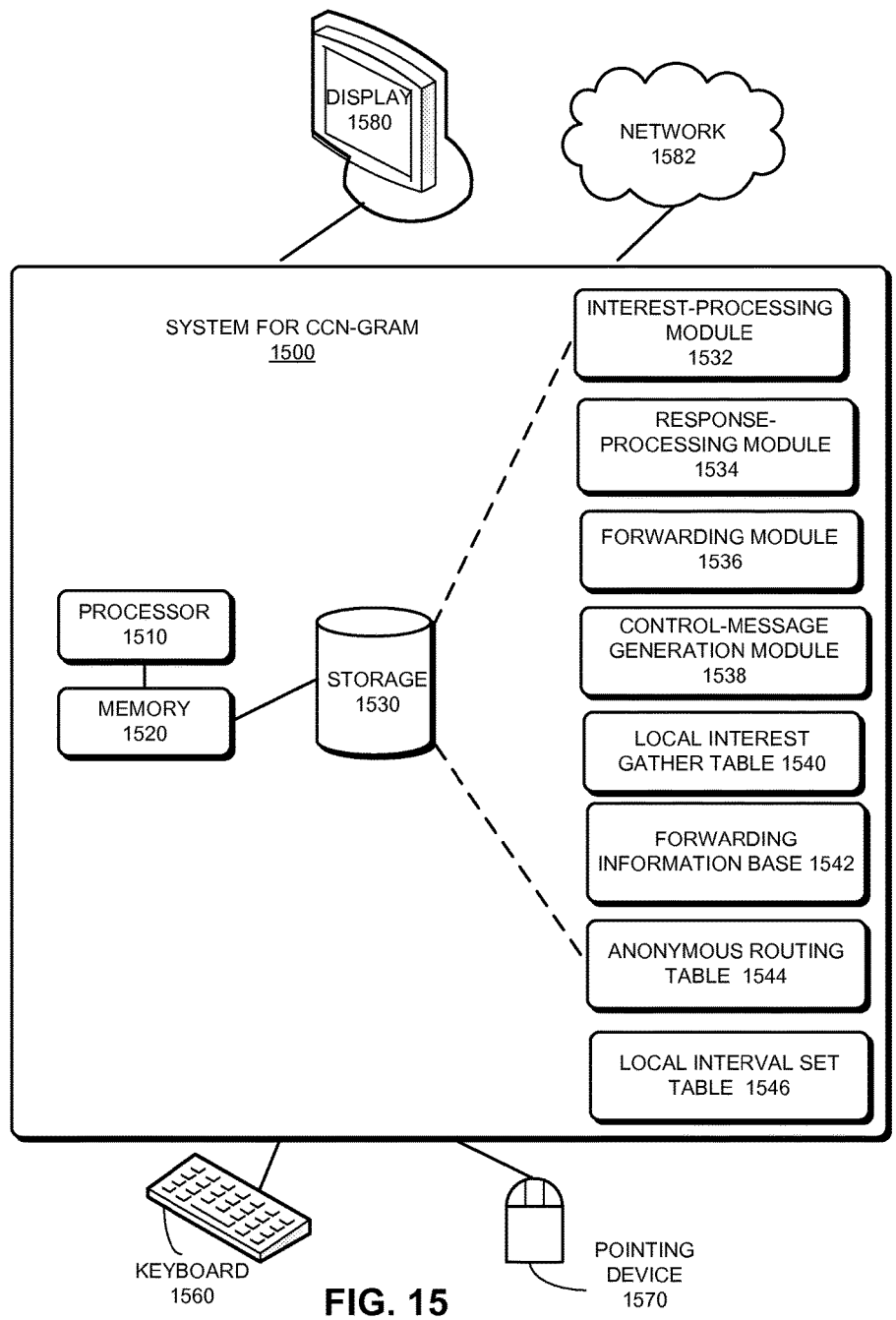
FIG. 15 illustrates an exemplary system for CCN-GRAM, in accordance with an embodiment of the present invention.

FIG. 15 illustrates an exemplary system for CCN-GRAM, in accordance with an embodiment of the present invention. A system 1500 for CCN-GRAM comprises a processor 1510, a memory 1520, and a storage 1530. Storage 1530 typically stores instructions that can be loaded into memory 1520 and executed by processor 1510 to perform the methods mentioned above. In one embodiment, the instructions in storage 1530 can implement an Interest-processing module 1532, a response-processing module 1534, a forwarding module 1536, and a control-message generation module 1538, all of which can be in communication with each other through various means. Storage 1530 can further comprise a number of data structures, such as a Local Interest Gathered Table 1540, a Forwarding Information Base 1542, an anonymous routing table 1544, and a local interval set table 1546.

In some embodiments, modules 1532, 1534, 1536, and 1538 can be partially or entirely implemented in hardware and can be part of processor 1510. Further, in some embodiments, the system may not include a separate processor and memory. Instead, in addition to performing their specific tasks, modules 1532, 1534, 1536, and 1538, either separately or in concert, may be part of general- or special-purpose computation engines.

Storage 1530 stores programs to be executed by processor 1510. Specifically, storage 1530 stores a program that implements a system (application) for CCN-GRAM. During operation, the application program can be loaded from storage 1530 into memory 1520 and executed by processor 1510. As a result, system 1500 can perform the functions described above. System 1500 can be coupled to an optional display 1580 (which can be a touchscreen display), keyboard 1560, and pointing device 1570, and can also be coupled via one or more network interfaces to network 1582.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A router in an information-centric network (ICN), comprising:
   a receiving module configured to receive an interest from a previous router for a piece of content, wherein the interest indicates a name associated with the piece of content and a previous identifier, wherein the previous identifier is selected from a set of identifiers assigned to the previous router by the router for a local interval between the router and the previous router in which the router does not assign a same set of identifiers to more than one router;
   an interest-processing module configured to:
      determine whether the interest can be forwarded;
      in response to determining that the interest can be forwarded to a second router, select an identifier from a set of identifiers assigned to the router by the second router for a local interval between the router and the second router in which the second router does not assign a same set of identifiers to more than one router, wherein the set of identifiers is received by the router in one of a hello message, a link-state advertisement, or a distance update and stored in a local interval set table of the router, wherein the identifier selected from the set of identifiers anonymizes an originator of the interest, and wherein to select the identifier, the interest-processing module is further configured to:
         perform a lookup in a local routing table based on the previous identifier;
         in response to a matching entry being found, using the matching entry as the selected identifier; and
         in response to no matching entry being found, apply a bijection function to the previous identifier to obtain the selected identifier from the set of identifiers assigned by the second router and stored in the local interval set table to generate an entry in the local routing table, wherein the generated entry specifies the selected identifier and the previous router;
      process the interest by inserting the selected identifier into the interest; and
   a forwarding module configured to forward the processed interest to the second router.

2. The router of claim 1, wherein the forwarding module is further configured to:
   in response to the interest-processing module determining that the interest cannot be forwarded, send a response to the interest.

3. The router of claim 2,
   wherein the interest-processing module is configured to determine that the interest cannot be forwarded based on one of:
      the piece of content cannot be found;
      no route can be found to a destination router advertising the piece of content; and
      the interest is traversing a loop; and
   wherein the response sent by the forwarding module includes a negative acknowledgment.

4. The router of claim 1, wherein the interest-processing module is configured to:
   in response to determining that the interest is received from a local user of the router, determine, based on a local interest table, whether a previous interest for the same piece of content exists;
   if so,
      aggregate the received interest by adding the local user to the local interest table; and
   if not,
      create a new entry in the local interest table for the piece of content.

5. The router of claim 1, wherein the interest-process module is further configured to:
   generate the processed interest by replacing the previous identifier carried in the received interest with the selected identifier.

6. The router of claim 1, wherein the set of identifiers comprises a set of continuously incrementing or decrementing numeric values.

7. The router of claim 1, further comprising:
   a response-receiving module configured to receive a response to the interest;
   a response-processing module configured to process the received response; and
   a response-forwarding module configured to forward the processed response;
   wherein while processing the received response, the response-processing module is configured to:
      identify a matching entry in the local routing table based on a response identifier carried by the response, wherein the matching entry specifies the previous router;
      map the response identifier to a response-forwarding identifier using a function specific to the previous router; and
      generate the processed response by replacing the response identifier with the response-forwarding identifier.

8. A non-transitory computer-readable storage medium storing instructions that when executed by a computing device cause the computing device to perform a method for content exchange in an information-centric network (ICN), the method comprising:

receiving, at a first node in the ICN, an interest from a previous node for a piece of content, wherein the interest indicates a name associated with the piece of content and a previous identifier, wherein the previous identifier is selected from a set of identifiers assigned to the previous node by the first node for a local interval between the first node and the previous node in which the first node does not assign a same set of identifiers to more than one node;

in response to determining that the interest can be forwarded to a second node, selecting, an identifier from a set of identifiers assigned to the first node by the second node for a local interval between the first node and the second node in which the second node does not assign a same set of identifiers to more than one node, wherein the set of identifiers is received by the first node in one of a hello message, a link-state advertisement, or a distance update and stored in a local interval set table of the first node, wherein the identifier selected from the set of identifiers anonymizes an originator of the interest, and wherein selecting the identifier further comprises:

performing a lookup in a local routing table based on the previous identifier;

in response to a matching entry being found, using the matching entry as the selected identifier; and in response to no matching entry being found, applying a bijection function to the previous identifier to obtain the selected identifier from the set of identifiers assigned by the second node and stored in the local interval set table to generate an entry in the local routing table, wherein the generated entry specifies the selected identifier and the previous node;

processing the interest by inserting the selected identifier into the interest; and forwarding the processed interest to the second node.

9. The computer-readable storage medium of claim 8, wherein the method further comprises:

sending a response to the interest, in response to determining that the interest cannot be forwarded.

10. The computer-readable storage medium of claim 9, wherein determining that the interest cannot be forwarded involves determining one of:

the piece of content cannot be found;

no route can be found to a destination router advertising the piece of content; and the interest is traversing a loop; and wherein the response includes a negative acknowledgment.

11. The computer-readable storage medium of claim 8, wherein the method further comprises:

in response to determining that the interest is received from a local user of the first node, determining, based on a local interest table, whether a previous interest for the same piece of content exists;

if so, aggregating the received interest by adding the local user to the local interest table; and if not, creating a new entry in the local interest table for the piece of content.

12. The computer-readable storage medium of claim 8, wherein the method further comprises:

generating the processed interest by replacing the previous identifier carried in the received interest with the selected identifier.

13. The computer-readable storage medium of claim 8, wherein the set of identifiers comprises a set of continuously incrementing or decrementing numeric values.

14. The computer-readable storage medium of claim 8, wherein the method further comprises:

receiving a response to the interest;

identifying a matching entry in the local routing table based on a response identifier carried by the response, wherein the matching entry specifies the previous node;

mapping the response identifier to a response-forwarding identifier using a function specific to the previous node;

generating a processed response by replacing the response identifier with the response-forwarding identifier; and forwarding the processed response to the previous node.

15. A computer-executable method, comprising:

receiving, at a first node in an information-centric network (ICN), an interest from a previous node for a piece of content, wherein the interest indicates a name associated with the piece of content and a previous identifier, wherein the previous identifier is selected from a set of identifiers assigned to the previous node by the first node for a local interval between the first node and the previous node in which the first node does not assign a same set of identifiers to more than one node;

in response to determining that the interest can be forwarded to a second node, selecting an identifier from a set of identifiers assigned to the first node by the second node for a local interval between the first node and the second node in which the second node does not assign a same set of identifiers to more than one node, wherein the set of identifiers is received by the first node in one of a hello message, a link-state advertisement, or a distance update and stored in a local interval set table of the first node, wherein the identifier selected from the set of identifiers anonymizes an address of an originator of the interest, and wherein selecting the identifier further comprises:

performing a lookup in a local routing table based on the previous identifier;

in response to a matching entry being found, using the matching entry as the selected identifier; and in response to no matching entry being found, applying a bijection function to the previous identifier to obtain the selected identifier from the set of identifiers assigned by the second node and stored in the local interval set table to generate an entry in the local routing table, wherein the generated entry specifies the selected identifier and the previous node;

processing the interest by inserting the selected identifier into the interest; and forwarding the processed interest to the second node.

16. The method of claim 15, further comprising sending a response to the interest, in response to determining that the interest cannot be forwarded.

17. The method of claim 16, wherein determining that the interest cannot be forwarded involves determining one of:

the piece of content cannot be found;

no route can be found to a destination router advertising the piece of content; and the interest is traversing a loop; and wherein the response includes a negative acknowledgment.

18. The method of claim 15, further comprising:

in response to determining that the interest is received from a local user of the first node, determining, based on a local interest table, whether a previous interest for the same piece of content exists;

if so,
   aggregating the received interest by adding the local user to the local interest table; and if not,
   creating a new entry in the local interest table for the piece of content.

19. The method of claim 15, wherein the method further comprises:
   generating the processed interest by replacing the previous identifier carried in the received interest with the selected identifier.

20. The method of claim 15, wherein the set of identifiers comprises a set of continuously incrementing or decrementing numeric values.

21. The method of claim 15, further comprising:
receiving a response to the interest;
identifying a matching entry in local routing table based on a response identifier carried by the response, wherein the matching entry specifies the previous node;
mapping the response identifier to a response-forwarding identifier using a function specific to the previous node;
generating a processed response by replacing the response identifier with the response-forwarding identifier; and
forwarding the processed response to the previous node.

* * * * *